UNITED STATES PATENT OFFICE.

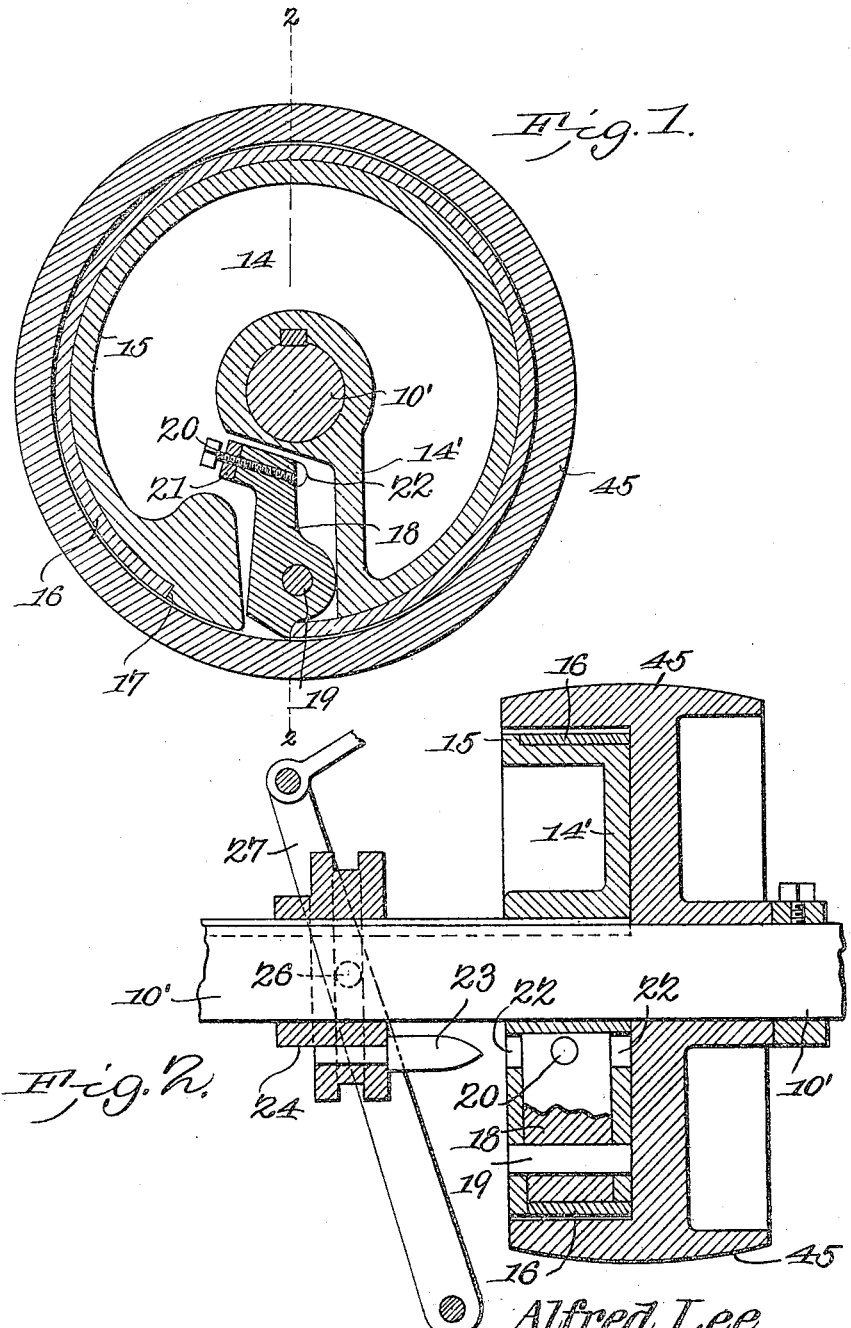

ALFRED LEE, OF BELLINGHAM, WASHINGTON.

CLUTCH.

No. 808,289. Specification of Letters Patent. Patented Dec. 26, 1905.

Application filed December 20, 1904. Serial No. 237,702.

*To all whom it may concern:*

Be it known that I, ALFRED LEE, a citizen of the United States, residing at Bellingham, in the county of Whatcom and State of Washington, have invented a new and useful Clutch, of which the following is a specification.

This invention relates to clutching mechanism, and has for its principal object to provide a simple form of clutch whereby two shafts may be coupled together or a pulley or other member secured in position on a shaft.

With this and other objects in view, as will more fully hereinafter appear, the invention consists in certain novel features of construction and arrangement of parts hereinafter fully described, illustrated in the accompanying drawings, and particularly pointed out in the appended claim, it being understood that various changes in form, proportions, size, and minor details of the structure may be made without departing from the spirit or sacrificing any of the advantages of the invention.

In the accompanying drawings, Figure 1 is a sectional elevation of a clutch constructed in accordance with the invention. Fig. 2 is a vertical section of the same on the line 2 2 of Fig. 1

Similar numerals of reference are employed to indicate corresponding parts throughout both figures of the drawings.

On the shaft 10' is mounted a loose pulley 45, free to rotate on said shaft, but held from longitudinal play thereon.

On the shaft 10' is keyed a clutch-disk 14, and the periphery of the disk is provided with an annular groove, one wall of which is formed by a continuous rim or flange 15. The flange is in part supported by a radially-disposed arm 14', that is provided with a recess for the reception of a clutching-lever 18, that is pivoted on a pin 19, extending across said opening and having its opposite ends supported by the arm 14' of the disk. The peripheral groove is arranged to receive a friction band or ring 16, which is not of sufficient length to extend completely around the disk one end of said band or ring abutting against the end wall 17 of the groove, while the opposite end projects some distance across the outer end of the opening formed in the arm 14' and is engaged by the outer end of the clutch-lever 18. The inner end of the lever is provided with a threaded opening for the passage of a screw 20, which may be locked in position of adjustment by a nut 21. The end of the screw is in alinement with a pair of openings 22, formed in the parallel walls of the arm 14' of the disk and adapted for the reception of a pointed pin 23, that is carried by a slidable sleeve 24.

The sleeve 24 is feathered on the shaft 10', and its periphery is grooved for the reception of pins or antifriction-rollers 26, carried by a suitable operating-lever 27, and when this lever is moved to the right the pin will enter the outer opening 22 and by engaging against the end of the screw 20 will operate as a cam to move the inner end of the lever 18, and the outer end of said lever by engagement against the end of the band 16 will expand the latter into frictional contact with the inner face of the pulley-rim, so that said pulley will be frictionally clutched to and will revolve with or will impart motion to the shaft 10. When the collar 24 is moved outward, pin 23 will move from engagement with the screw, and the inherent contractile tendency of the band 16 will move the latter away from the inner surface of the rim of the pulley and will restore the lever 18 to its initial position, so that the lever and flanged disk may freely rotate with the shaft without imparting movement to the pulley, or vice versa.

It will be noted that the operating-lever 18 is fully housed by the metal of the arm 14' and is protected from injury, while the arm materially strengthens the disk at the point where strain is imposed by the operation of the clutch.

Having thus described the invention, what is claimed is—

In a device of the class specified, a loose member having an annular flange, a flanged disk arranged within said flange and provided with a radially-arranged recessed arm, said disk being provided with a peripheral groove terminating at one end in a stop-shoulder, a band arranged within the groove and having one end fitting against the shoulder, and its opposite end extending partly over the recess of said arm, a lever pivotally supported within the recess and having its outer end engaging against the free end of the band, a set-screw carried by the inner end of the lever, and a cam-pin movable through an opening in said arm and serving by engagement with the set-screw to operate the lever.

In testimony that I claim the foregoing as my own I have hereto affixed my signature in the presence of two witnesses.

ALFRED LEE.

Witnesses:
P. F. WHITING,
WASHINGTON WILSON.